UNITED STATES PATENT OFFICE.

H. G. TYER AND J. HELM, OF NEW BRUNSWICK, NEW JERSEY.

IMPROVEMENT IN THE MANUFACTURE OF INDIA-RUBBER.

Specification forming part of Letters Patent No. 6,066, dated January 30, 1849.

*To all whom it may concern:*

Be it known that we, HENRY GEORGE TYER and JOHN HELM, of New Brunswick, in the county of Middlesex, in the State of New Jersey, have invented a new and Improved Composition of Caoutchouc, Zinc, and Sulphur; and we do hereby declare that the following is a full and exact description of the manner of compounding the same.

The nature of our invention consists in forming a compound of caoutchouc, carbonate of zinc, or other preparations of that metal, as hereinafter mentioned, and sulphur, which is perfectly elastic, impermeable to air or water, unchangeable in extreme temperatures, preserving its color without "bloom," and free from the deadly action upon the constitution and health hitherto experienced by the operatives employed in the preparation of metallic or vulcanized rubber.

To enable others skilled in the manufacture of rubber and its compounds to use our invention, we will proceed to describe the method of mixing and preparing the same.

We take, say, fifty-six pounds of caoutchouc, rendered plastic by the usual solvents, or by the combined action of heat and grinding in the machines ordinarily used for that purpose in rubber-works, and gradually add thereto, while masticating, fifty-six pounds of carbonate of zinc, commonly called *lapis caliminaris*, and finally mixing therewith three pounds eight ounces of sulphur, the whole to be well kneaded and incorporated.

When we wish to impart color to our composition, as is sometimes necessary in the manufacture of certain descriptions of goods, we add, in compounding, as much lamp-black, ocher, or other coloring-matter as will produce the required result. The mass is then ready to be manufactured into sheets, water-proof cloths, shoes, or such other articles as may be required. We afterward submit the same to a high degree of artificial heat, from 280° Fahrenheit to 300°, placing such goods in an oven or chamber heated by ordinary fuel, or in a receptacle in which the temperature is raised by steam, continuing them in that state from two to six hours, according to the thickness or bulk of the articles to be heated or "cured," which latter process is well known to all manufacturers of metallic rubber.

We do not wish to confine ourselves to the precise proportions above mentioned, as we frequently vary the same according to the requirements of the article into which it is to be manufactured, decreasing the quantity of carbonate of zinc when a greater elasticity is wanted, and increasing the same when toughness and ductility only are the requisites. Neither do we at all times grind sulphur in with our composition, but soak the gum in turpentine or camphene saturated with sulphur; or we merely dust the surface of the manufactured article with sulphur previously to being heated, as above mentioned; and the desired effect will also be produced by introducing the vapor of sulphur under steam or atmospheric pressure into the heated chamber in which the goods are placed, all which matter of detail respecting the manner of introducing sulphur into our composition forms no part of our claim, such methods being daily in use by manufacturers of metallic or vulcanized combinations. Again, we do not confine ourselves to the use only of carbonate of zinc in our composition, having frequently used with excellent effect the native sulphuret of zinc or blende, frequently called by miners "black-jack," and other salts of zinc can be used; but we have produced the best article by the use of the carbonate, as above mentioned.

We here disclaim the use of rubber and sulphur alone, as also the submitting of rubber or rubber compounds to a high degree of heat, patents having been granted for that process in this and other countries. Neither do we wish to secure the right of coloring rubber, such having frequently been done by rubber-manufacturers; but What we do claim, and wish to secure by Letters Patent, is—

The combination of caoutchouc in its several varieties with either carbonate of zinc, sulphate of zinc, or the other salts of zinc, with sulphur, in manner, form, and proportion as hereinbefore set forth.

H. G. TYER.
                    JOHN HELM.

Witnesses:
  HALY FISK,
  W. H. LEUPP.